June 6, 1939.   F. H. REES   2,161,432
PYROMETER WELL
Filed Jan. 18, 1937

INVENTOR
Frank H. Rees
BY
ATTORNEY

Patented June 6, 1939

2,161,432

UNITED STATES PATENT OFFICE 2,161,432

PYROMETER WELL

Frank H. Rees, Ponca City, Okla., assignor to Continental Oil Company, Ponca City, Okla., a corporation of Delaware Application January 18, 1937, Serial No. 121,049

2 Claims. (Cl. 136—4)

My invention relates to pyrometer wells or wells for thermometers or other heat responsive means for measuring the temperature within conduits or chambers used in various industrial processes.

It has been customary to place a heat expansive means in a well which comprises an elongated tube closed at one end, adapted to be inserted through the side wall of a chamber or conduit in which liquid or materials are being processed, the temperature of which it is desired to record. The elongated tube is usually fitted and made integral with means for securing it in a threaded opening or the like formed in the side wall of the conduit or chamber. The thermometer wells are expansive and being made of a single piece of metal, must be designed from the point of view of strength especially in cases where high pressures exist within the spaces the temperatures of which are being measured. Frequently, corrosive materials are employed and corrosion of the well will necessitate the replacement of the entire well. A weak point in the present construction exists in the region where the well proper is formed by machining the metal to a minimum thickness. The portion of larger thickness is threaded for insertion into the side wall of a conduit or chamber. Unfortunately, non-corrosive materials often lack sufficient strength to be safely employed where high pressures are used.

Any injury of a thermometer well necessitates its disposal and replacement.

One object of my invention is to provide a thermometer well construction in which the well is supported in the region of the juncture between the bushing and the well proper.

Another object of my invention is to provide a thermometer well construction in which a corrosion resisting metal may be employed for the well and a strength material may be employed for the bushing.

Another object of my invention is to provide a removable thermometer well, whereby thermometer wells of different lengths and constructions may be employed in a common bushing.

Other and further objects of my invention will appear from the following description.

In the accompanying drawing which forms part of the instant specification and is to be read in conjunction therewith and in which like reference numerals are used to indicate like parts in the various views, Figure 1 is a perspective view showing my thermometer well assembly in disassembled position.

Figure 1:
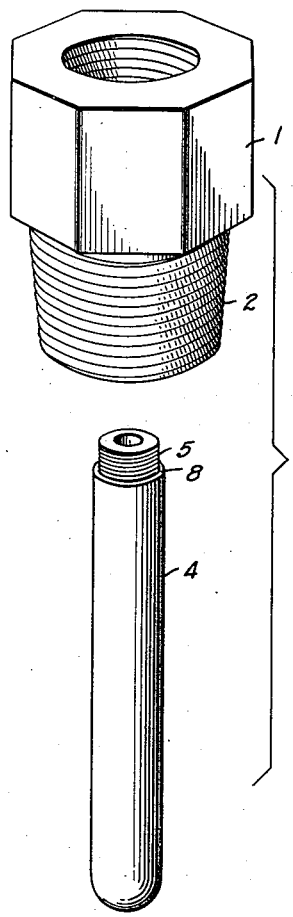
Figure 2:
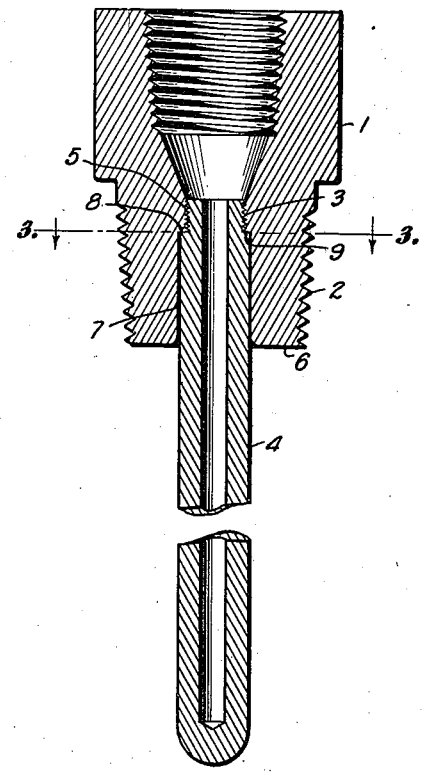
Figure 2 is a sectional view of my thermometer well assembly.
Figure 3:
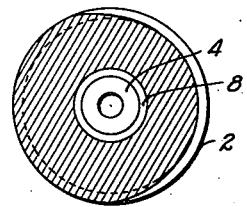
Figure 3 is a sectional view taken on a line 3—3 of Figure 2.

In general, my invention contemplates the provision of a bushing for insertion into a threaded opening in a conduit or chamber which bushing is provided with means for removably receiving a thermometer well.

More particularly referring to the drawing, a bushing 1 which may be made of any strength material such as steel, is externally threaded with screw threads 2 for insertion into a correspondingly threaded opening in a vessel the temperature of which it is desired to observe. The bushing is provided with internal screw threads 3 by means of which a thermometer well 4, provided with screw threads 5 at its open end, is adapted to be supported. The thermometer well 4 may be made out of corrosion resisting material such as copper, brass, or the like. The screw threads 3 are positioned at a distance removed from the inner face 6 of the bushing 1 so that the side walls 7 of the bore in which the thermometer well is seated will act to support the upper end of the thermometer well, preventing undue strain upon the screw threads with a possible breaking off of the thermometer well at this point. The upper end of the well is provided with a portion of reduced diameter which is screw threaded at 5, thus forming a shoulder 8 which is adapted to seat against a similar shoulder 9 formed in the body of the bushing 1.

It is believed my construction will be clear from the foregoing description. It will be observed that I have accomplished the objects of my invention. I am enabled to provide a thermometer well construction in which the bushing may be made of strength material and the well per se may be made of corrosion resisting material. The weak point in the thermometer wells of the prior art at the point of reduction of the diameter of the bushing to form the well proper is eliminated by the recessing of the tip threads of the thermometer well into the bushing body, thus providing support by the side walls of the bore supporting the well as a cantilever. It will be observed that it is possible to use a comparatively small number of bushings, while having a large number of wells of different lengths for different surfaces. Injury to the well in use would not necessitate the replacing of the entire assembly as is the case in the wells of the prior art.

The wells of the prior art cost from eight dollars to ten dollars, since they are made of one piece of metal and require considerable machine work. The thermometer wells of my invention can be made for from two dollars to two and one half dollars each, thus representing a considerable economic advantage.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a thermometer well a bushing adapted to be threadedly supported by a wall of a chamber, the temperature of which it is desired to measure, a bore formed within said bushing, said bore being provided with an internal shoulder at a point removed from the lower end of said bushing, screw threads provided within said bore above said shoulder and a thermometer tube provided with coacting screw threads and shoulder at its upper end adapted to be seated in said bushing bore with said tube shoulder sealed against said bore shoulder, the external diameter of said thermometer tube being substantially the same as the internal diameter of said bore whereby said thermometer tube will be supported by the interior walls of said bushing.

2. A thermometer well as in claim 1 wherein said bushing is made of steel and said thermometer tube is made of non-corrosive material.

FRANK H. REES.